United States Patent [19]

Tsai et al.

[11] Patent Number: 5,401,446
[45] Date of Patent: Mar. 28, 1995

[54] METHOD AND APPARATUS FOR THE ELECTROSTATIC CHARGING OF A WEB OR FILM

[75] Inventors: Peter P. Tsai; Larry C. Wadsworth, both of Knoxville, Tenn.

[73] Assignee: The University of Tennessee Research Corporation, Knoxville, Tenn.

[21] Appl. No.: 958,958

[22] Filed: Oct. 9, 1992

[51] Int. Cl.⁶ ............................................. B29C 71/04
[52] U.S. Cl. ..................................... 264/22; 204/165; 361/225; 361/233
[58] Field of Search .......................... 264/22; 204/165; 361/225, 233

[56] References Cited

U.S. PATENT DOCUMENTS

| | | | |
|---|---|---|---|
| 4,215,682 | 8/1980 | Kubik et al. | 128/205.29 |
| 4,239,973 | 12/1980 | Kolbe et al. | 250/531 |
| 4,375,718 | 3/1983 | Wadsworth et al. | |
| 4,513,049 | 4/1985 | Yamasaki et al. | 428/194 |
| 4,534,918 | 8/1985 | Forrest, Jr. | 264/22 |
| 4,588,537 | 5/1986 | Klasse et al. | 264/22 |
| 4,592,815 | 6/1986 | Nakao | 204/165 |
| 4,626,263 | 12/1986 | Inoue et al. | 55/155 |
| 4,874,659 | 10/1989 | Ando et al. | 428/221 |
| 4,904,174 | 2/1990 | Moosmayer et al. | 425/174.8 E |
| 4,997,600 | 3/1991 | Okumura et al. | 264/22 |
| 5,051,159 | 9/1991 | Togashi et al. | 204/165 |
| 5,122,048 | 6/1992 | Deeds | 425/174.8 E |

FOREIGN PATENT DOCUMENTS 245108  11/1987  European Pat. Off. .
305620  8/1989  European Pat. Off. .
1493183  11/1977  United Kingdom .

OTHER PUBLICATIONS

Author: J. Van Turnhout Title: "Electret Filters for High-Efficiencey Air Cleaning" Publication: Journal of Electrostatics, 8 (1980) pp. 369-379.

Author: Dr. Dipl. Ing. Edward Szuchi Title: "Contribution to the Production of Melt-Blown Nonwovens" Publication: Melliand English Apr. 1991-Translation of Melliland Textiberichte 72(1991), p. 270.

Author: J. W. C. Adams Title: "Specialty Nonwovens with Enhanced Filtration Performance" Publication: INDA Association of the Nonwoven Fabrics Industry (Undated).

Author: Katsutoshi Ando Title: "Synthetic Electret Filter Media for HEPA Filtration" Publication: INDA Association of the Nonwoven Fabrics Industry (Undated).

Primary Examiner—Leo B. Tentoni
Attorney, Agent, or Firm—Weiser & Associates

[57] ABSTRACT

Method and apparatus for electrostatically charging a web or film by subjecting the web or film to an electric field generated between a single bar or wire electrode and the curved surface of a second electrode, and optionally sequentially subjecting the web or film to subsequent electric fields preferably in which the polarity of the field, relative to the web or film, is reversed.

50 Claims, 3 Drawing Sheets

METHOD AND APPARATUS FOR THE ELECTROSTATIC CHARGING OF A WEB OR FILM

FIELD OF THE INVENTION

The present invention relates to methods and apparatus for forming electrostatic charges on a web or film and the webs and films formed therefrom. More specifically, the invention relates to the cold electrostatic charging of webs or films.

BACKGROUND OF THE INVENTION

Electrically charged fibrous materials to be used as a filtration medium have been known for some time. In U.S. Pat. No. 2,740,184, Thomas discloses a process of charging thermoplastic, fibrous webs by softening the fibers in the webs with heat and, while such fibers are soft, subjecting them to suitable electrostatic field to produce a charged web.

U.S. Pat. No. 4,215,682 to Kubik, et al., discloses methods for the preparation of electrically charged meltblown fibers in which the meltblown fibers are charged with an electrostatic charge immediately after they are formed and then deposited in a web. Similar hot charging processes are disclosed, for example, in U.S. Pat. No. 4,904,174 to Moosmayer, et al., and U.S. Pat. No. 5,122,048 to Deeds.

Webs charged by such hot charging methods do not have the charge density that is necessary to obtain the desired filtration of particles from air flows or other fluid flows. In addition, the currently available hot charging methods are inconvenient to set up, as in the vicinity of the spinnerets, or require the additional expenditure of energy to reheat the web to a temperature suitable for charging.

There are also several cold charging processes for the preparation of charged webs. For example, U.S. Pat. No. 4,375,718 to Wadsworth, et al., and U.S. Pat. No. 4,588,537 to Klaase, et al., describe processes for the corona charging of combined webs made from layers of materials with differing conductivities. U.S. Pat. No. 4,592,815 to Nakao describes placing a nonconductive web between the surface of a grounded metal electrode and a series of discharge electrodes.

The currently available methods for cold charging a web also have problems developing the desired charge densities and, in addition, suffer from the added problem of having the charge bleed off the web with time.

SUMMARY OF THE INVENTION

It is an object of the present invention to provide a method and apparatus for charging a web or film without the inconvenience and expense of hot charging methods.

It is a further object of the present invention to provide a method and apparatus for charging a web or film such that the charge does not bleed off as in prior cold charged webs or films.

Consideration of the specification, including the several figures and examples to follow, will enable one skilled in the art to determine additional objects and advantages of the invention.

It has been discovered by the present inventors that a suitable web or film may be conveniently cold charged by sequentially subjecting the web or film to a series of electric fields such that adjacent electric fields have substantially opposite polarities with respect to each other. Thus, one side of the web or film is initially subjected to a positive charge while the other side of the web or film is initially subjected to a negative charge. Then, the first side of the web or film is subjected to a negative charge and the other side of the web or film is subjected to a positive charge. Such webs as are produced by the methods and apparatus of the present invention have relatively high charge densities without an attendant surface static electrical charge which would be inappropriate for use in operating rooms or other combustible environments.

For the purposes of this discussion and for use in the claims, the terms "positive" and "negative" are meant to be relative terms. For example, a pair of electrodes will have a positive electrode and a negative electrode any time there is a difference in potential between the two electrodes. The positive electrode, for the purposes of this discussion, will be the electrode with the more positive (or less negative) potential, while the negative electrode will be the electrode with the more negative (or less positive) potential.

Also, it is well known to practitioners in the art that the techniques for charging webs may be effectively used to charge films and vice versa. Therefore, for the remainder of the discussion of the invention, the terms "web" and "film" will be considered to be interchangable.

Thus, the present invention provides a method for charging a web having first and second sides. The method comprises the steps of, first, inducing a negative charge adjacent the first side of the web, and a positive charge adjacent the second side of the web, and, then, inducing a positive charge adjacent the first side of the web, and a negative charge adjacent the second side of the web. The present invention also provides that the method comprises sequentially inducing, a plurality of times, a charge adjacent the first side of the web, wherein the charge after inducing is substantially opposite the charge adjacent the first side of the web immediately prior to inducing, and inducing a charge adjacent the second side of the web wherein the charge after inducing is substantially opposite the charge adjacent the second side of the web immediately prior to inducing.

In a preferred embodiment of the invention, the web is subjected to electric fields which are between about 1 kVDC/cm and about 12 kVDC/cm. In a more preferred embodiment of the invention, the web is subjected to electric fields which are between about 4 kVDC/cm and about 10 kVDC/cm. In a most preferred embodiment of the invention, the web is subjected to electric fields which are about between about 7 and 8 kVDC/cm.

The present invention also provides for an apparatus for applying an electrostatic charge to a web having first and second sides. The apparatus comprises a first charging means for inducing a negative charge adjacent the first side of the web and a positive charge adjacent the second side of the web, and, preferably, at least a second charging means for inducing a positive charge adjacent the first side of the web and a negative charge adjacent the second side of the web.

In a preferred embodiment of the invention, the apparatus includes a plurality of charging means for inducing a charge adjacent the first side of the web, wherein the charge after inducing is substantially opposite the charge adjacent the first side of the web immediately prior to the web being subjected to each of the plurality of means for inducing, and for inducing a charge adjacent the second side of the web wherein the charge after inducing is substantially opposite the charge adjacent the second side of the web immediately prior to the web being subjected to each of the plurality of means for inducing.

In a further preferred embodiment of the apparatus, the web is a moving sheet web and the apparatus further comprises means for feeding the web to the first charging means, and means for taking up the web from the plurality of charging means for inducing.

In additional preferred embodiments of the invention, the charging means generate electric fields of between about 1 kVDC/cm and about 12 kVDC/cm. In a more preferred embodiment of the invention, the charging means generate electric fields which are between about 4 kVDC/cm and about 10 kVDC/cm. In a most preferred embodiment of the invention, the charging means generate electric fields which are between about 7 kVDC/cm and 8 kVDC/cm.

It has also been discovered by the inventors that webs may be effectively charged by an apparatus comprising a web travelling over a biased metal or otherwise conductive drum or roller and in the vicinity of a biased or grounded charging bar. Such an apparatus produces suitably charged webs after a single pass of the web through the apparatus. The webs produced are bipolar and show high filtering efficiency. Previously, charging apparatus required that charging drums be grounded only.

The charging seen when using an apparatus of the present invention is in contrast to the charging of a web according to the prior art as illustrated by U.S. Pat. No. 4,592,815 to Nakao. The apparatus shown in U.S. Pat. No. 4,592,815 charges a web by placing it in contact with a drum and beneath a series of charging bars arranged in a circular pattern about the drum. The bars are charged and the drum is maintained at a ground. The electrical fields from charging bars are driven together near the surface of a web and the drum. Thus, the fields are very concentrated near the surface of the web. Even at low electric field levels, the concentration of electric field near the surface of the web may be sufficient to cause arcing from the charging bars to the drum. Thus, it is often difficult to produce a web by the method of U.S. Pat. No. 4,592,815 without grounding the drum or cylinder.

In contrast, the method of the present invention produces webs without the need to ground the drum or roller. The electric field between a single charging bar and a drum is more spread out across the surface of a web. Therefore, the drum may be either grounded (as in U.S. Pat. No. 4,592,815) or biased. A bias on the drum may then be effectively used to control the polarity and charge density on both sides of the web. Hence, the filtration efficiency and charge retention of the web are improved.

It has further been discovered that webs may be effectively charged by an apparatus comprising a charging bar having an applied voltage and a charging shell substantially surrounding and apart from the charging bar. The sheet web or film is positioned between the charging bar and the charging shell, and is not in contact with the charging bar or the charging shell. The sheet web or film maybe a moving sheet web or film. Therefore, the apparatus further comprises means for feeding said sheet web or film to a position between the charging bar and the charging shell and means for taking up said sheet web or film from a position between the charging bar and the charging shell. In the use of the apparatus, the charging shell may be grounded or biased to an opposite polarity with respect to the charging bar. Again, the webs produced using the above apparatus are bipolar and show high filtering efficiency.

The present invention is suitable for charging nonwoven webs or films prepared from nonconductive polymeric material such as those selected from the group consisting of polypropylene (PP), recycled and virgin polyethylene terephthalate (PET), all types of polyethylene (PE), such as linear low density polyethylene (LLDPE), polybutylene terephthalate (PBT), polycarbonates, polychlorotrifluoroethylene (PCTFE), and polycyclohexyldimethylene terephthalate (PCT). In addition, the present invention is suitable for charging composite webs containing both conductive and nonconductive fibers such as meltblown/cotton/meltblown thermally bonded webs or meltblown/cotton hydroentangled or needle-punched webs, or hydroentangled mixtures of carded polyester staple fibers and wood tissue, such as SONTARA webs (Du Pont).

It has also been discovered by the inventors that a web comprising a mixture of polyolefins including from about 99 wt. % to about 70 wt. % of a first polyolefin, and from about 1 wt. % to about 30 wt. % of a second polyolefin modified by grafting from about 3 wt. % to about 10 wt. % based on the weight of the second polyolefin, of acrylic acid, or some other anionic or cationic (e.g., quaternary ammonium) groups, to the second polyolefin may be effectively charged. Such webs unexpectedly retain charges far longer than would be expected. In general, it would be expected that webs containing anionic (or cationic) materials would facilitate the movement of the charges through the web resulting in neutralization of the charges and eventual bleed off of the charge. However, the presently disclosed web is effectively charged to significantly increase its filtration efficiency and it has been shown to retain that efficiency even after accelerated aging tests.

In preferred embodiments of the invention, the first and second polyolefins are identical. In a more preferred embodiment, the polyolefins are polypropylene. The present invention also sets forth that the second polyolefin is preferably modified by grafting about 6 wt. % of acrylic acid onto the second polyolefin.

BRIEF DESCRIPTION OF THE DRAWINGS

Reference to the following detailed description of an exemplary embodiment may help to better explain the invention. Consider the description in conjunction with the drawings in which.

DETAILED DESCRIPTION OF THE INVENTION

Figure 1:
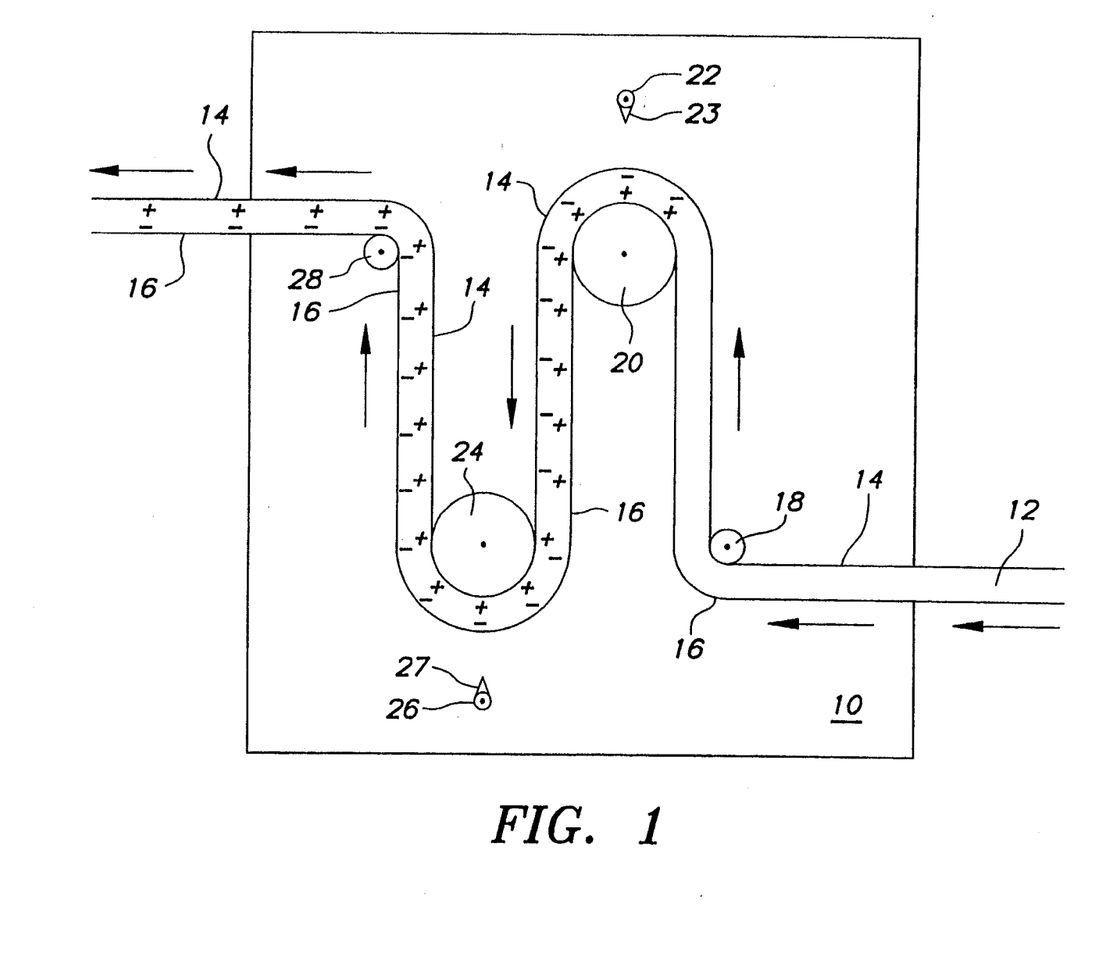
FIG. 1 shows a schematic drawing of one embodiment of the present invention for cold charging a web.

Referring now to the drawings in which like reference characters designate like or corresponding parts throughout the several views, FIG. 1 shows an embodiment of an apparatus 10 for cold charging a web in accordance with the present invention. The depicted apparatus 10 generally comprises an uncharged moving web 12 having a first side 14 and a second side 16. The web 12 may have a triboelectric charge associated with the relative inherent electronegative/electropositive nature of the polymer. In addition, the web 12 may be a web that has been precharged by either a hot or cold charging process. The web 12 passes into the apparatus 10 with the first side 14 in contact with positioning roller 18. The second side 16 of the web 12 then comes in contact with the first charging drum 20 which rotates with the web 12 and brings the web 12 into a position between the first charging drum 20 and a first charging bar 22. Charging bar 22, as shown, may include point emitters 23 extending outwardly toward charging drum 20.

In the following discussion, the first charging drum 20 is assumed to be negatively charged and the first charging bar 22 is assumed to be positively charged. These assumptions are for the ease of describing the operation of the invention only and are not intended to limit the scope of the invention to those specific relative potentials.

As the web 12 passes between the charging bar 22 and the charging drum 20, an electrostatic charge is developed adjacent the two sides 14 and 16 of the web 12. A relative negative charge is developed adjacent the first side 14 of the web 12 and a relative positive charge is developed adjacent the second side 16 of the web 12. The web 12 then passes on to a negatively charged second charging drum 24 and, further, to a position between the charging drum 24 and a second charging bar 26 where the web 12 has the polarity of its charge reversed. This effect is seen in polyolefin fibers but is not always seen in webs prepared from fibers of, for example, polyesters or PCTFE. That is, a relative positive charge is developed adjacent the first side 14 of the web 12 and a relative negative charge is developed adjacent the second side 16 of the web 12. The charged web 12 then passes on to a positioning roller 28 and out of the apparatus. Charging bar 26, as shown, may include point emitters 27 extending outwardly toward charging drum 24.

In the practice of the invention, both of the charging drums 20 and 24 are held at a relative negative charge while the charging bars 22 and 26 are held at a relative positive charge. However, since different sides of the web 12 are in contact with the charging drums (the second side 16 is in contact with the first charging drum 20 and the first side 14 is in contact with the second charging drum 24) the charges adjacent to the sides 14 and 16 of the web 12 are changed during the charging of the web 12 in the apparatus 10. Thus, the first side 14 is first negatively charged and then positively charged, and the second side is first positively charged and then negatively charged.

Without being bound by theory, it is believed that the switch in polarity of the charges adjacent to the sides 14 and 16 of the web 12 contributes to an improvement in the charge density of the charged web as well as an improvement in the lifetime of the charge in the web. The specific reasons for this observed improvement are currently unknown to the inventors.

Figure 2:
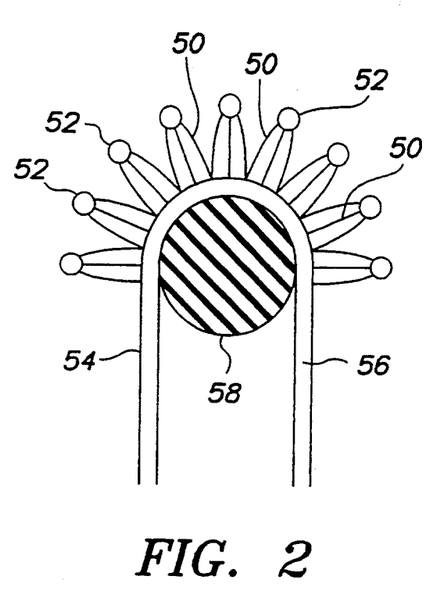
FIG. 2 shows a schematic drawing of the electrical fields of a method for cold charging a web according to the prior art.

The charging seen when using an apparatus as shown in FIG. 1 is in contrast to the charging of a web according to the prior art as illustrated by U.S. Pat. No. 4,592,815 to Nakao. The apparatus shown in U.S. Pat. No. 4,592,815 charges a web by placing it in contact with a drum and beneath a series of charging bars arranged in a circular pattern about the drum. The bars are charged and the drum is maintained at a ground. As is shown in FIG. 2, the electrical fields 50 from the charging bars 52 are driven together near the surface 54 of the web 56 and the drum 58. Thus, the fields 50 are very concentrated near the surface 54 of the web 56. Even at low electric field levels, the concentration of electric field 50 near the surface 54 of the web 56 may be sufficient to cause arcing from the charging bars 52 to the drum 58. Thus, it is often difficult to produce a web by the method of U.S. Pat. No. 4,592,815 without grounding the drum or cylinder.

Figure 3:
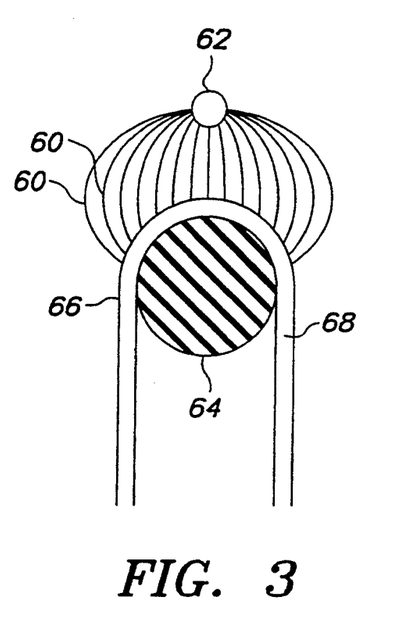
FIG. 3 shows a schematic drawing of the electrical fields of a method for cold charging a web according to the apparatus shown in FIG. 1.

In contrast, the method of the present invention, as illustrated in the apparatus of FIG. 1, produces webs without the need to ground the drum. As is shown in FIG. 3, the electric field 60 between the single charging bar 62 and the drum 64 is more spread out across the surface 66 of the web 68. The metal or otherwise conductive drum or roller 64 may be either grounded (as in U.S. Pat. No. 4,592,815) or biased. A bias on the drum 64 is used to control the polarity and charge density on both sides of the web 68. Hence, the filtration efficiency and charge retention of the web are improved.

Figure 4:
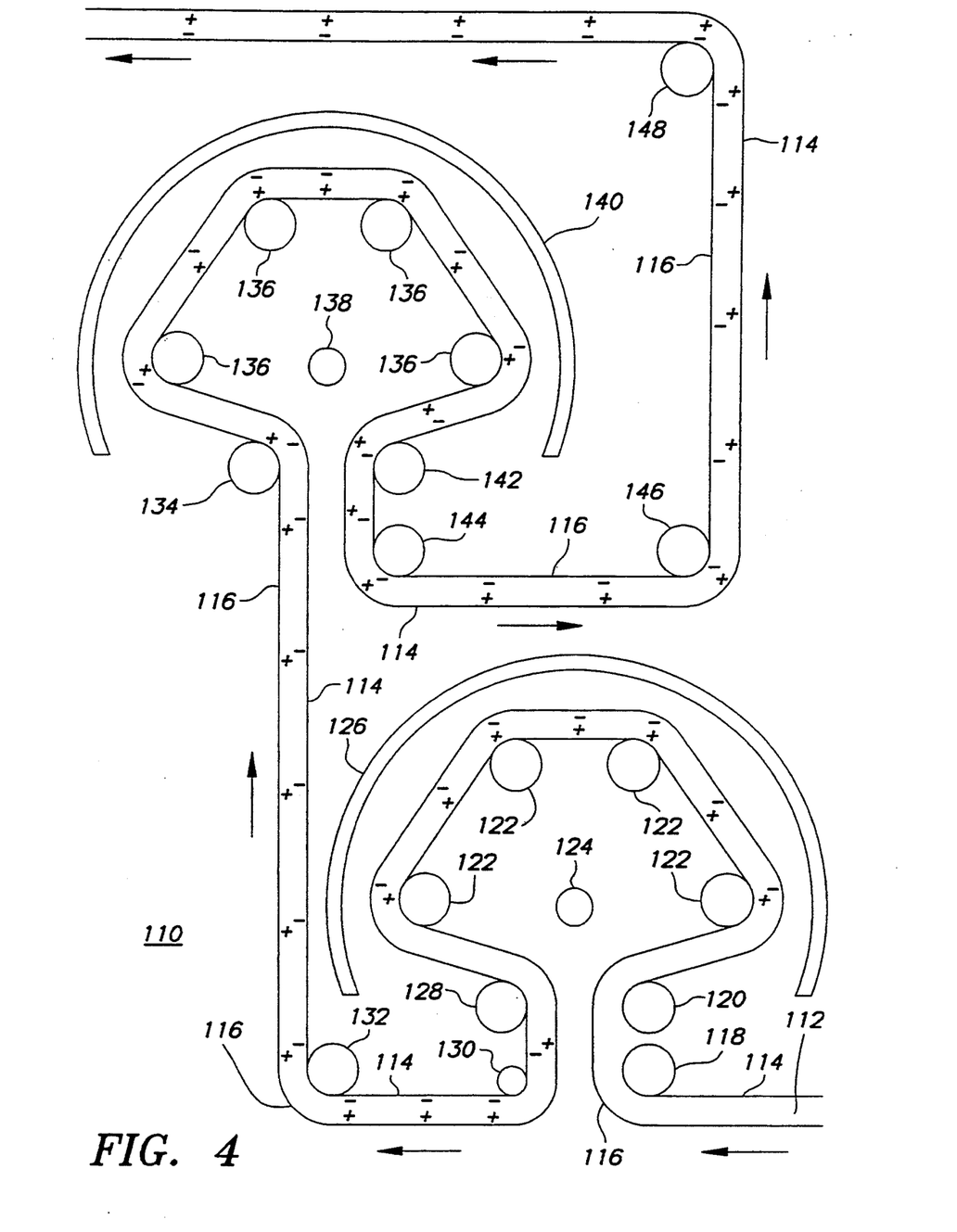
FIG. 4 shows a schematic drawing of another embodiment of the present invention for cold charging a web.

Another embodiment of the invention is shown in FIG. 4 which shows an alternate apparatus 110 for cold charging a web in accordance with the present invention. The depicted apparatus 110 generally comprises an uncharged moving web 112 having a first side 114 and a second side 116. The web 112 may have a triboelectric charge associated with the relative inherent electronegative/electropositive nature of the polymer. In addition, the web 112 may be a web that has been precharged by either a hot or cold charging process. The uncharged web 112 passes into the apparatus 110 with the first side 114 in contact with a first positioning roller 118. The web 112 then passes over a second positioning roller 120 and onto first charging positioning rollers 122 which position the web 112 between the first charging wire 124 and the first charging shell 126. The rollers 122 are generally made of nonconductive insulating materials such as wood, plastic, or ceramic.

In the following discussion, the first charging wire 124 is assumed to be negatively charged and the first charging shell 126 is assumed to be positively charged. These assumptions are for the ease of describing the operation of the invention only and are not intended to limit the scope of the invention to those specific relative potentials.

The charges on the first charging wire 124 and the first charging shell 126 induce a charge in the web 112 such that there is a relative positive charge adjacent the second side 116 of the web 112 and a relative negative charge adjacent the first side 114 of the web 112.

The web 112 then passes on to third, fourth, fifth, and sixth positioning rollers 128–134 before passing onto second charging positioning rollers 136 which position the web 112 between the second charging wire 138 and the first charging shell 140. Again, the rollers 136 are generally made of nonconductive insulating materials such as wood, plastic, or ceramic.

The charges on the second charging wire 138 and the second charging shell 140 induce a change in the polarity of the charge in the web 112 such that there is a relative negative charge adjacent the second side 116 of the web 112 and a relative positive charge adjacent the first side 114 of the web 112. The web 112 then passes over the positioning rollers 142–148 and out of the apparatus 110.

As in the apparatus 10 described in FIG. 1, the apparatus 110 of FIG. 4 provides a web which has had the polarity of its charge changed during the charging process. Again, the resulting web retains a long lasting high charge density. This is shown in the increase and the relative stability of the filtration efficiency of webs treated according to the present invention.

Figure 5:
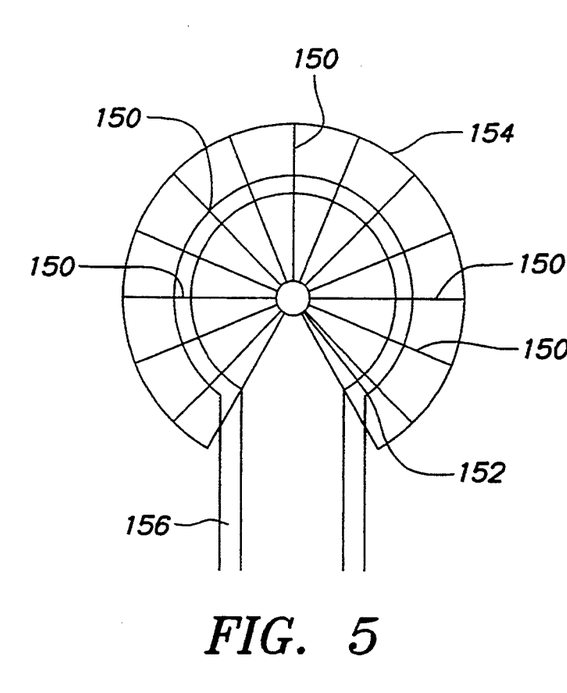
FIG. 5 shows a schematic drawing of the electrical fields of a method for cold charging a web according to the apparatus shown in FIG. 4.

Again, there is a general decrease in the number and size of pinholes (due to arcing between the drum and the charging bar) in the charged web. As in the apparatus shown in FIG. 1, the apparatus shown in FIG. 4 has a dispersed electric field. As is shown in FIG. 5, the electric field lines 150 from the charging bar 152 to the shell 154 are spread across a rather wide area.

In order to provide a further understanding of the present invention, the following examples primarily illustrate certain more specific details thereof.

Definitions

In order to better understand the terms used herein, particularly in the Examples set forth below, the following definitions consistent with the accepted technical definitions in the industry, are submitted.

Filtration Efficiency—is the measure of the ability of a web to remove particles from a flow of (gaseous or liquid) fluid. The filtration efficiency is related to the penetration ability, P, of small particles and is calculated as:

filtration efficiency = $(100-P)\%$.

Filter Quality—is another measure of the ability of a web to remove particles from a flow of (gaseous or liquid) fluid. The filter quality, $q_F$, is related to the particle penetration through a web, P and to the pressure drop across the web, $\Delta p$, according to the formula:

$q_F = [\ln(1/P)]/[\Delta p]$.

See William C. Hinds, "Aerosol Technology: Properties, Behavior, and Measurement of Airborne Particles," John Wiley & Sons, New York, p. 170 (1982).

Equipment

Filtration Measurement

A TSI Model 8110 automated filter tester was used for the measurement of media filtration efficiency. Two percent sodium chloride solution (20 g NaCl in 1 liter of water) was aerosolized by an aerosol generator. The NaCl/water drops in aerosol were heated and NaCl crystallites with a 0.1 μm diameter were formed. The mass concentration of NaCl in the air was 101 mg/m³. Photometry was used to detect the volume concentration of the air in the upstream volume of the media ($C_u$) and the volume concentration of the air in the downstream volume of the media ($C_d$). The penetration ability of the NaCl particles was calculated as:

penetration = $P = [C_d/C_u](100\%)$, and filtration efficiency was calculated as:

filtration efficiency = $(100-P)\%$.

Surface Charge Potential

A Monroe Model 244 Isoprobe Electrostatic Voltmeter with a 1017E Probe (0.07 in. opening) was connected to a Velmex system which allows webs with dimensions up to 20×38 inches to be scanned with the probe in both the machine (MD) and cross-machine (CD) directions. The measurement system was interfaced with an IBM AT computer using DT 2801 I/O system (Data Translation Inc., Marlborough, Mass.). The average and standard deviation of scanned data were simultaneously computed along with the absolute average (the average of the absolute value of the surface charge potential).

EXAMPLE I

Cold Charging using Contact Cloth

Table I lists the conditions and charging results for a variety of webs charged according to the method disclosed in U.S. Pat. No. 4,375,718 to Wadsworth, et al., which is incorporated herein by reference. Table II lists the measured surface charge potential for those webs.

TABLE I

| No.[a] | Filt. Eff.[b] | Charging Voltage[c] | Filt. Eff.[d] | Δp | $q_F$ |
|---|---|---|---|---|---|
| 1 | 11.2 | −20, +20 | 63.30 | 0.9 | 1.176 |
| 2 | 45.7 | −20, +20 | 98.708 | 2.2 | 1.977 |
| 3 | 45.83 | −20, +20 | 98.426 | 1.9 | 2.386 |
| 4 | 43.5 | −20, +20 | 99.000 | 2.1 | 2.193 |
| 5 | 24.55 | −20, +20 | 84.775 | 0.9 | 2.091 |
| 6 | 41.55 | −18.5, +20 | 98.460 | 2.45 | 1.703 |
| 7 | 71.65 | −21, +21 | 99.937 | 6.8 | 1.084 |

[a]1 is 1 oz/yd² LLDPE; 2 is 1 oz/yd² PP with 10% PP grafted with 6% acrylic acid; 3 is 2 oz/yd² recycled PET; 4 is 1 oz/yd² PCT; 5 is 1 oz/yd² recycled PET; 6 is 1 oz/yd² PP; 7 is 3 oz/yd² PP.
[b]Before charging.
[c]kV for top, bottom.
[d]After charging.
[e]mm of H₂O.

TABLE II

| | Surface Charge Potential | | | |
|---|---|---|---|---|
| | Screen Side | | Face Side | |
| No.[a] | Arith. Avg. | Abs. Avg. | Arith. Avg. | Abs. Avg. |
| 1 | +206 | 323 | −345 | 360 |
| 2 | +26 | 318 | −99 | 175 |
| 3 | −50 | 456 | +70 | 292 |
| 4 | −207 | 609 | +1031 | 1031 |
| 5 | +137 | 263 | +231 | 425 |
| 6 | +327 | 355 | −153 | 238 |
| 7 | +468 | 1081 | −790 | 878 |

[a]Same samples as in Table I.

Table I shows how the filtering efficiency of various webs can be improved by cold charging according to U.S. Pat. No. 4,375,718. As is shown in Table II, the charging of the webs by the method produces bipolar (i.e., different charges on opposite sides) webs.

EXAMPLE II

Cold Charging using the Apparatus of FIG. 1

Table III lists the conditions and charging results for a variety of webs charged on an apparatus according to FIG. 1. Table IV lists the measured surface charge potential for those webs.

TABLE III

| No.[a] | Filt. Eff.[b] | Charging Voltage[c] | Filt. Eff.[d] | Δp | $q_F$ |
|---|---|---|---|---|---|
| 8 | 71.65 | +20 (charged 2X) | 99.317 | 6.83 | 0.730 |
| 9 | 71.65 | +20 (charged 1X) | 98.610 | 6.8 | 0.629 |
| 10 | 41.55 | +22 (charged 1X) | 98.308 | 2.4 | 1.700 |
| 11 | 41.55 | +21 (charged 2X) | 98.718 | 2.5 | 1.743 |
| 12 | 76.45 | +20 (charged 2X) | 98.063 | 9.7 | 0.407 |
| 13 | 24.55 | +22 (charged 2X) | 89.010 | 1.1 | 2.007 |
| 14 | 24.55 | +22 (charged 1X) | 90.33 | 1.0 | 2.336 |

[a]8 and 9 are 3 oz/yd² PP; 10 and 11 are 1 oz/yd² PP; 12 is a meltblown/cotton/meltblown thermally bonded composite; 13 and 14 are 1 oz/yd² recycled PET.
[b]Before charging.
[c]Charge on the wire in kV; the rollers were grounded.
[d]After charging.

TABLE IV

| | Surface Charge Potential | | | |
|---|---|---|---|---|
| | Screen Side | | Face Side | |
| No.[a] | Arith. Avg. | Abs. Avg. | Arith. Avg. | Abs. Avg. |
| 8 | +54 | 404 | −465 | 481 |
| 9[b] | +523 | 576 | −637 | 637 |
| 10[b] | +570 | 570 | +670 | 670 |
| 11 | +174 | 239 | −192 | 212 |
| 12 | −9 | 31 | +185 | 185 |
| 13 | −143 | 256 | −178 | 206 |
| 14[b] | 34 | 201 | −179 | 208 |

[a]Same samples as in Table IV.
[b]Single charge with screen side adjacent the negatively charged roller.

Table III shows that the process of charging a web with the apparatus of FIG. 1 produces webs with good filtering efficiencies and excellent filtration qualities. In addition, Table IV shows that the process produces bipolar webs with good charge differentials between the two sides of the web.

EXAMPLE III

Cold Charging using the Apparatus of FIG. 4

Table V lists the conditions and charging results for a variety of webs charged on an apparatus according to FIG. 4. Table VI lists the measured surface charge potential for those webs.

TABLE V

| No.[a] | Filt. Eff.[b] | Charging Voltage[c] | Filt. Eff.[d] | Δp | $q_F$ |
|---|---|---|---|---|---|
| 15 | 71.65 | +23, −19 (2X) | 99.956 | 6.9 | 1.120 |
| 16 | 71.65 | +21, −19 (1X) | 99.950 | 6.55 | 1.160 |
| 17 | 41.55 | +25, −19 (2X) | 96.278 | 2.3 | 1.431 |
| 18 | 41.55 | +25, −19 (1X) | 95.525 | 2.55 | 1.218 |
| 19 | 24.55 | +25, −19 (2X) | 80.35 | 0.9 | 1.808 |
| 20 | 24.55 | +25, −15 (1X) | 81.90 | 1.0 | 1.709 |

[a]15 and 16 are 3 oz/yd² PP; 17 and 18 are 1 oz/yd² PP; 19 and 20 are 1 oz/yd² recycled PET.
[b]Before charging.
[c]kV for wire, shell (number of chargings).
[d]After charging.

TABLE VI

| | Surface Charge Potential | | | |
|---|---|---|---|---|
| | Screen Side | | Face Side | |
| No.[a] | Arith. Avg. | Abs. Avg. | Arith. Avg. | Abs. Avg. |
| 15 | +1062 | 1099 | −2208 | 2208 |
| 16[b] | +1235 | 1239 | −1678 | 1678 |
| 17 | +183 | 297 | −30 | 166 |
| 18[b] | −37 | 183 | −275 | 294 |
| 19 | −179 | 244 | −66 | 164 |
| 20[b] | −233 | 283 | −126 | 186 |

[a]Same samples as in Table IV.
[b]Single charge with screen side adjacent the negatively charged shell.

Table V shows that the process of charging a web with the apparatus of FIG. 4 produces webs with good filtering efficiencies and excellent filtration qualities for high basis weight webs (i.e., greater than about 2 oz/yd²) and produces webs with adequate filtration efficiencies and filtration qualities for lower basis weight webs (i,e,, less than about 2 oz/yd²). In addition, Table VI shows that the process produces bipolar webs with good charge differentials between the two sides of the web.

EXAMPLE IV

Accelerated Aging Teats samples of the various webs were subjected to a temperature of 137° C. for 10 minutes to simulate the effects of aging on the charge of the web. The results are shown in Table VII.

TABLE VII

| No. | Filt. Eff.[a] | Filt. Eff.[b] | Δp[a] | Δp[b] | $q_F^a$ | $q_F^b$ |
|---|---|---|---|---|---|---|
| 2 | 98.708 | 92.390 | 2.2 | 2.1 | 1.977 | 1.227 |
| 6 | 98.460 | 97.370 | 2.45 | 2.2 | 1.703 | 1.653 |
| 7 | 99.937 | 99.866 | 6.8 | 6.1 | 1.084 | 1.084 |
| 8 | 99.317 | 99.279 | 6.83 | 6.1 | 0.730 | 0.809 |
| 9 | 98.610 | 98.588 | 6.8 | 6.2 | 0.629 | 0.687 |
| 10 | 98.308 | 97.583 | 2.4 | 2.2 | 1.700 | 1.692 |
| 11 | 98.718 | 97.178 | 2.5 | 2.2 | 1.743 | 1.622 |
| 12 | 98.063 | 96.143 | 9.7 | 9.8 | 0.407 | 0.332 |
| 15 | 99.956 | 99.925 | 6.9 | 6.3 | 1.120 | 1.142 |
| 16 | 99.950 | 99.886 | 6.55 | 6.0 | 1.160 | 1.129 |
| 17 | 96.278 | 95.858 | 2.3 | 2.2 | 1.431 | 1.447 |
| 18 | 95.525 | 94.913 | 2.55 | 2.2 | 1.218 | 1.354 |

[a]Before accelerated aging.
[b]After accelerated aging.

The webs produced according to the methods of the present invention show excellent response to the accelerated aging test. The filtering efficiency and the filtration quality are maintained at consistent levels, at least as good as the prior art.

EXAMPLE V

Biased Charging Drum Charging

Low basis weight (1 oz/yd²) and high basis weight (3 oz/yd²) polypropylene webs were charged with an apparatus according to FIG. 1. In all cases, the charging bar was applied with a positive charge while the charging drum was biased with a negative charge according to Table VIII. Table IX shows conditions and charging results for the webs charged on an apparatus according to FIG. 1, and Table X lists the measured surface charge potential for those webs.

TABLE VIII

| | Charging Voltages (kVDC) | | | |
|---|---|---|---|---|
| No.[a] | Bar 1 | Bar 2 | Drum 1 | Drum 2 |
| 21 | +10.5 | +10.5 | −10.5 | −10.5 |
| 22 | +16 | +16 | −4 | −4 |
| 23 | +15 | +15 | −4 | −4 |
| 24 | +9 | +9 | −9 | −9 |

[a]21 and 22 are 3 oz/yd² polypropylene; 23 and 24 are 1 oz/yd² polypropylene.

TABLE IX

| No.[a] | Filt. Eff.[b] | Filt. Eff.[c] | Δp | $q_F$ |
|---|---|---|---|---|
| 21 | 71.65 | 97.308 | 6.45 | 0.560 |
| 22 | 71.65 | 98.607 | 5.2 | 0.822 |
| 23 | 41.55 | 99.191 | 2.5 | 1.927 |
| 24 | 41.55 | 98.844 | 2.5 | 1.984 |

[a]Same as in Table VIII.
[b]Before charging.
[c]After charging.

TABLE X

| No.[a] | Surface Charge Potential | | | |
|---|---|---|---|---|
| | Screen Side | | Face Side | |
| | Arith. Avg. | Abs. Avg. | Arith. Avg. | Abs. Avg. |
| 21 | +100 | 356 | −238 | 284 |
| 22 | −76 | 287 | −315 | 351 |
| 23 | +540 | 540 | −592 | 592 |
| 24 | +527 | 527 | −505 | 505 |

[a]Same as in Table VIII.

As is seen in Tables VIII–X, webs are produced using biased charging drums. Contrary to the expectations of the prior art, the webs exhibit high values of filtering efficiency and filtration quality.

EXAMPLE VI

Charging of Anionically Grafted Polyolefin

A polyolefin web was prepared by mixing an original polypropylene with a poly propylene that had been grafted with 6 wt. % acrylic acid. The polyolefin mixture was charged by a variety of methods. Table XI shows conditions and charging results for the webs.

TABLE XI

| No.[a] | Chg. Method[b] | Filt. Eff.[c] | Filt. Eff.[d] | Δp | $q_F$ |
|---|---|---|---|---|---|
| 25 | A | 45.70 | 98.708 | 2.2 | 1.977 |
| 26 | B | 38.25 | 99.103 | 2.25 | 2.095 |
| 27 | B | 45.70 | 98.695 | 2.05 | 2.117 |
| 28 | C | 45.70 | 97.33 | 2.6 | 1.39 |
| 29 | C | 45.70 | 96.37 | 2.5 | 1.33 |

[a]25, 27, 28 and 29 are 10 wt. % grafted polypropylene in 90 wt. % ungrafted polypropylene; 26 is 5 wt. % grafted polypropylene in 90 wt. % ungrafted polypropylene.
[b]A is the contact cloth method of U.S. Pat. No. 4,375,718 to Wadsworth, et al.; B is the method using the apparatus of FIG. 1; C is the method using the apparatus of FIG. 4.
[c]Before charging.
[d]After charging.

The table shows that the web is efficiently charged to acceptable levels so as to produce a web with substantially good filtering efficiency and filtration quality. Upon accelerated aging testing, sample numbers 25 and 28 also showed good retention of the charge. Sample number 25 had a filtering efficiency of 92.390 and Sample number 28 had a filtering efficiency of 87.64. As was discussed above, these results are unexpected in light of the nature of the mixture. The presence of anions grafted to the polyolefin would lead a person having skill in the art to predict that the charge would bleed off the web with time.

Although this specification discloses particular embodiments of the invention, these examples merely describe illustrations of the invention. Those skilled in the art may suggest numerous rearrangements, modifications and substitutions of parts of the invention without departing from the spirit of the invention. In particular, it will occur to a skilled practitioner in the art that a similar type of charging may be effected by alternately varying the polarity of the charging rollers and charging bars rather that varying the side of the web that is exposed to the rollers and webs.

The appended claims set forth various novel and useful features of the invention.

What is claimed is:

1. A method for electrostatically charging a web or film having first and second sides, the method comprising:

inducing a positive charge adjacent the first side of said web or film, and a negative charge adjacent the second side of said web or film; and inducing a negative charge adjacent the first side of said web or film, and a positive charge adjacent the second side of said web or film;

and further comprising sequentially inducing a plurality of times a) a charge adjacent the first side of said web or film, wherein the charge after inducing is substantially opposite the charge adjacent the first side of said web or film immediately prior to inducing, and b) a charge adjacent the second side of said web or film wherein the charge after inducing is substantially opposite the charge adjacent the second side of said web or film immediately prior to inducing.

2. The method of claim 1 wherein each of the plurality of electric fields are between about 1 kVDC/cm and about 12 kVDC/cm.

3. The method of claim 2 wherein each of the plurality of electric fields are between about 4 kVDC/cm and about 10 kVDC/cm.

4. The method of claim 3 wherein each of the plurality of electric fields are between about 7 kVDC/cm and about 8 kVDC/cm.

5. The method of claim 1 wherein the web or film is a nonwoven web.

6. The method of claim 5 wherein the nonwoven web is prepared from a nonconductive polymer selected from the group consisting of polypropylene (PP), recycled and virgin polyethylene terephthalate (PET), linear low density polyethylene (LLDPE), polybutylene terephthalate (PBT), polychlorotrifluoroethylene (PCTFE), polycarbonate, and polycyclohexylmethylene terephthalate (PCT).

7. The method of claim 5 wherein the nonwoven web is prepared from polypropylene prepared with from about 1 wt. % to about 30 wt. % of polypropylene having 6 wt. % grafted acrylic acid.

8. The method of claim 5 wherein the nonwoven web is a composite web including at least one nonconductive web layer and at least one conductive layer.

9. A method of electrostatically charging a web or film which method comprises generating a dispersed non-arcing electric field between an electrode means having an electrically conductive curved surface and a single conductive bar or wire spaced from said curved surface, and passing the web or film through and subjecting it to the dispersed non-arcing electric field between said bar or wire and said curved surface.

10. The method of claim 9 wherein the electrode means is a conductive drum, the curved surface is the outer surface of the drum, and the web or film is in contact with the outer surface of the drum as it passes through the electric field which is generated between the conductive bar or wire and the curved surface.

11. The method of claim 9 wherein the electrode means is a conductive shell, the curved surface is the inner surface of the shell, and the web or film is in contact with neither the conductive bar or wire nor the curved surface as it passes through the electric field which is generated between the conductive bar or wire and the curved surface.

12. The method of claim 9 wherein the web or film is uncharged prior to being subjected to the electric field.

13. The method of claim 9 wherein the web or film is precharged prior to being subjected to the electric field.

14. The method of claim 9 wherein the web or film which passes through and is subjected to the electric field is a single layer of nonconductive material.

15. The method of claim 9 wherein the electric field is between about 1 kVDC/cm and about 12 kVDC/cm.

16. The method of claim 15 wherein the electric field is between about 4 kVDC/cm and about 10 kVDC/cm.

17. The method of claim 16 wherein the electric field is between about 7 kVDC/cm and about 8 kVDC/cm.

18. The method of claim 9 wherein the web or film is a nonwoven web.

19. The method of claim 18 wherein the nonwoven web is constituted of a nonconductive polymer selected from the group consisting of polypropylene (PP), recycled and virgin polyethylene terephthalate (PET), linear low density polyethylene (LLDPE), polybutylene terephthalate (PBT), polychlorotrifluoroethylene (PCTFE), polycarbonate, and polycyclohexylmethylene terephthalate (PCT).

20. The method of claim 18 wherein the nonwoven web comprises a mixture of polyolefins including from about 99 wt. % to about 70 wt. % of a first polyolefin, and from about 1 wt. % to about 30 wt. % of a second polyolefin having grafted thereon about 3 wt. % to about 10 wt. %, by weight of the second polyolefin, of anionic or cationic groups.

21. The method of claim 20 wherein the anionic or cationic group grafted on the second polyolefin is acrylic acid.

22. The method of claim 21 wherein said first and second polyolefins are polypropylene and the amount of grafted acrylic acid is about 6 wt. %.

23. The method of claim 18 wherein the nonwoven web consists essentially of a single layer of a nonconductive polymeric material.

24. The method of claim 18 wherein the nonwoven web is a composite web comprising at least one nonconductive polymer layer and at least one conductive layer.

25. The method of claim 9 which further comprises generating one or more subsequent dispersed non-arcing electric fields between one or more subsequent electrode means, each of which has a curved surface, and a corresponding number of subsequent single conductive bars or wires, each bar or wire being spaced from the corresponding curved surface of an electrode means, and passing the web or film sequentially through and subjecting it to each dispersed non-arcing electric field between said curved surfaces and said bars or wires, so that the polarity of the charge to which a side of the web or film is exposed upon passage through each subsequent electric field is of opposite polarity to that to which the side was exposed upon passage through the previous electric field.

26. The method of claim 25 wherein the web or film is passed through and subjected to two electric fields.

27. The method of claim 25 wherein each electrode means is a conductive drum, the curved surface is the outer surface of each drum, and the web or film is in contact with the outer surface of each drum as it sequentially passes through the electric fields which are generated between each conductive bar or wire and each corresponding curved surface.

28. The method of claim 25 wherein each electrode means is a conductive shell, the curved surface is the inner surface of each shell, and the web or film is in contact with neither the conductive bar or wire nor the curved surface as it sequentially passes through the electric fields which are generated between each conductive bar or wire and each corresponding curved surface.

29. The method of claim 25 wherein the web or film is uncharged prior to being subjected to the first electric field.

30. The method of claim 25 wherein the web or film is precharged prior to being subjected to the first electric field.

31. The method of claim 25 wherein the web or film is a single layer of nonconductive material.

32. The method of claim 25 wherein each electric field is between about 1 kVDC/cm and about 12 kVDC/cm.

33. The method of claim 32 wherein each electric field is between about 4 kVDC/cm and about 10 kVDC/cm.

34. The method of claim 33 wherein each electric field is between about 7 kVDC/cm and about 8 kVDC/cm.

35. The method of claim 25 wherein the web or film is a nonwoven web.

36. The method of claim 35 wherein the nonwoven web is prepared from a nonconductive polymer selected form the group consisting of polypropylene (PP), recycled and virgin polyethylene terephthalate (PET), linear low density polyethylene (LLDPE), polybutylene terephthalate (PBT), polychlorotrifluoroethylene (PCTFE), polycarbonate, and polycyclohexylmethylene terephthalate (PCT).

37. The method of claim 36 wherein the nonwoven web is prepared from a polyolefin.

38. The method of 37 wherein the polyolefin is a polypropylene.

39. The method of claim 35 wherein the nonwoven web comprises a mixture of polyolefins including form about 99 wt. % to about 70 wt. % of a first polyolefin, and from about 1 wt. % to about 30 wt. % of a second polyolefin having grafted thereon about 3 wt. % to about 10 wt. %, by weight of the second polyolefin, of anionic or cationic groups.

40. The method of claim 39 wherein the anionic or cationic group grafted on the second polyolefin is acrylic acid.

41. The method of claim 40 wherein said first and second polyolefins are polypropylene and the amount of grafted acrylic acid is about 6 wt. %.

42. The method of claim 35 wherein the nonwoven web consists essentially of a single layer of a nonconductive polymeric material.

43. The method of claim 35 wherein the nonwoven web is a composite web comprising at least one nonconductive polymer layer and at least one conductive layer.

44. The method of claim 9 wherein the web or film which is subjected to the electric field has substantially the same conductivity throughout the thickness of the web or film.

45. The method of claim 25 wherein the web or film which is subjected to the electric fields has substantially the same conductivity throughout the thickness of the web or film.

46. The method of claim 9 wherein said electrode means which has a curved surface is biased with a charge, and the charging bar or wire is biased with a charge of opposite polarity or is grounded.

47. The method of claim 10 wherein said conductive drum is biased with a charge, and the charging bar or wire is biased with a charge of opposite polarity or is grounded.

48. The method of claim 10 wherein the drum is rotatable.

49. The method of claim 27 wherein the drum is rotatable.

50. The method of claim 11 wherein the web or film as it passes through said electric field is supported by a multiplicity of nonconductive insulating rollers positioned between the conductive bar or wire and the curved surface, which rollers are of wood or plastic.

* * * * *